US006690281B2

(12) United States Patent
Palmer

(10) Patent No.: US 6,690,281 B2
(45) Date of Patent: Feb. 10, 2004

(54) WATER DETECTOR AND ALARM

(76) Inventor: Joseph A. Palmer, P.O. Box 33, Meridian, ID (US) 83680-0033

(*) Notice: Subject to any disclaimer, the term of this patent is extended or adjusted under 35 U.S.C. 154(b) by 152 days.

(21) Appl. No.: 10/025,850

(22) Filed: Dec. 18, 2001

(65) Prior Publication Data

US 2002/0113713 A1 Aug. 22, 2002

Related U.S. Application Data

(60) Provisional application No. 60/256,826, filed on Dec. 18, 2001.

(51) Int. Cl.[7] .......................... G08B 21/20; G01M 3/04

(52) U.S. Cl. ...................... 340/604; 340/605; 340/620; 73/40

(58) Field of Search ................................ 340/604, 605, 340/620, 601–603, 612, 616, 618; 73/40, 40.5 A, 40.5 R, 49.2; 137/312

(56) References Cited

U.S. PATENT DOCUMENTS

| | | | | | |
|---|---|---|---|---|---|
| 3,010,320 | A | * | 11/1961 | Sollecito | 73/304 C |
| 3,889,247 | A | * | 6/1975 | Voll | 340/620 |
| 4,099,167 | A | * | 7/1978 | Pomerantz et al. | 340/620 |
| 4,227,190 | A | * | 10/1980 | Kelley et al. | 340/604 |
| 4,264,902 | A | * | 4/1981 | Miller | 340/604 |
| 4,276,454 | A | * | 6/1981 | Zathan | 200/61.05 |
| D261,998 | S | | 11/1981 | Munz | |
| 4,325,060 | A | * | 4/1982 | Purtell et al. | 340/604 |
| 4,408,193 | A | * | 10/1983 | Millen | 340/566 |
| 5,091,715 | A | * | 2/1992 | Murphy | 340/604 |
| 5,357,241 | A | * | 10/1994 | Welch et al. | 340/605 |
| 6,157,303 | A | * | 12/2000 | Bodie et al. | 340/573.6 |

OTHER PUBLICATIONS

Water alert web page accessed Dec. 22, 1999, 6 pages.

* cited by examiner

*Primary Examiner*—Jeffery Hofsass
*Assistant Examiner*—Anne V. Lai
(74) *Attorney, Agent, or Firm*—Robert L. Shaver; Frank J. Dykas; Stephen M. Nipper

(57) ABSTRACT

A water detection device and alarm. The water detection device includes protruding electrodes above and below the device which detect water on a surface below the device, and water dripping from above the device. The electrodes are rod-shaped, and can penetrate a material to detect moisture in subsurface regions of the material. The device has a lifting ring, and may be placed in difficult to access positions by means of the lifting ring. A deflector cone directs water from above the device into a splash ring. When water or moisture completes a circuit between two of the electrodes, an alarm enunciator signals the presence of water.

12 Claims, 6 Drawing Sheets

WATER DETECTOR AND ALARM

PRIORITY

This application claims the priority date of the provisional application entitled Water Detector and Alarm filed on Dec. 18, 2001, with U.S. Ser. No. 60/256,826, Joseph A. Palmer.

DESCRIPTION BACKGROUND OF THE INVENTION

1. Field of the Invention

The present invention generally relates to water detectors, and more particularly relates to water detectors and alarms which sense for water and moisture on a surface and in a material.

2. Background Information

There are many situations in which it is desirable to know if water is present on a surface or in a material. This could be important in an environment which is subject to occasional water leaks, so that the presence of water can be detected and remedial actions taken. This could occur in a typical household in a number of places. It would occur behind appliances such as washers, dishwashers, hot water heaters, water softeners, hot tubs, kitchen sink area, or any place where water is typically contained and where a spill of water would be an occasional problem. It would also be advantageous to be able to detect and be notified of the presence of water and moisture in such situations as under an aquarium, where a water leak might indicate a cracked hose, pipe, or glass. It would also be useful to know if water was leaking into an area, such as carpeting in a basement, into a crawl space, or into a wooden structure.

What is needed is a device which can be easily placed in a confining location, such as behind appliances, and which can be left there for a long period of time to detect the presence of moisture and sound an alarm. It would also be advantageous if the device were able to sense water which is dripping from above and striking the detector. It would also be advantageous if the device had a low battery signal to signal the user when the battery should be changed, or the unit replaced. It would also be advantageous to have a water detector which could sense water through a number of pathways, so that there are multiple detection locations under the sensor. It would also be advantageous to be able to detect water presence above or below the device. It would also be advantageous to have a device which could detect moisture below the surface of a material.

SUMMARY OF THE INVENTION

These and other objects are achieved by the water detector of the present invention. The water detector of the present invention is configured for detecting water leaks and for detecting water and moisture present on a surface and within a material. The water leak detector includes a lower body section in which are located a number of lower electrode ports. The lower body section is joined with an upper body section to form the water leak detector body. The upper body section also defines a number of upper electrode ports. The electronic components of the device are located within the leak detector body formed by the upper body section and the lower body section. A number of electrodes extend through the electrode ports of the upper and lower body sections. A circuit board is located within the leak detector body, and contacts the electrodes which extend through the leak detector body. On the circuit board is located a battery for providing power to the electronic components and to an enunciator, for signaling the presence of water. When water or moisture is present between any of the electrodes which extend above and below the leak detector body, the moisture forms a route for the flow of electricity, thereby completing a previously open circuit, and allowing power from the battery to activate the enunciator. The enunciator is configured to sound until the circuit is broken. It can also be configured to sound periodically, in order to preserve the life of the battery.

The electrodes can be configured to extend out from the body of the leak detector. In the configuration of the device in which the electrodes are thin and pin-like, the electrodes can penetrate materials and sense moisture below the surface of a material. In this way, the leak detector can sense moisture in the various depths of carpet material, even though the surface of the carpet may be dry. Similarly, if the electrodes are pressed into the earth in a crawl space, moisture can be detected below the earth even though the surface may be dry. The electrodes can also be pressed into other materials, such as wood, foam, fabrics, and other porous materials.

In one configuration of the leak detector, the leak detector body is generally disc shaped. The electrodes are in contact with the circuit board through a number of contact regions. In one embodiment of the device, the contact regions are vias, which are holes defined in the circuit board, through which the electrodes extend. From their contact at the circuit board, the electrodes extend through the lower electrode ports of the lower body section, as well as the upper electrode ports of the upper body section. A deflector may also be included which can be cone-shaped and configured for directing water away from the center of the upper body section, and towards the electrodes, which are located around the periphery of the disc-shaped water leak detector. A lifting ring can be attached to the top of the deflector or the top of the upper body section. By use of the lifting ring, the detector may be positioned and removed in difficult to reach locations.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
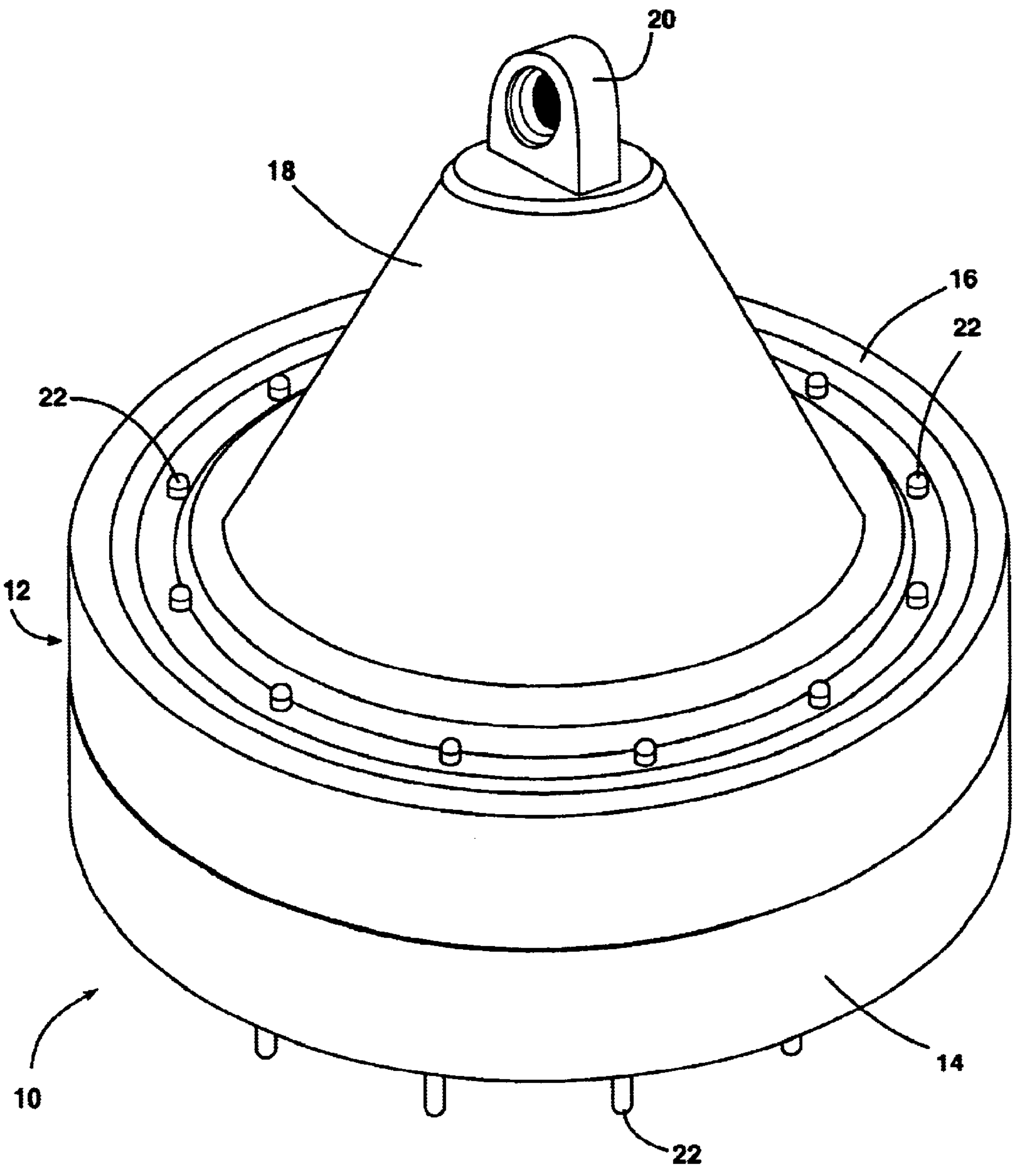
FIG. 1 is a perspective view of the water detector.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The invention is a water detector which is designed to sound an audible alarm when water is detected. It is compact enough to fit behind appliances in a kitchen, or behind a washer or dryer in a laundry room. It could also fit easily under a sink, in an aquarium stand or under and aquarium, or in any place where water might be expected to leak. It could even be used on a carpet in a basement which is subject to leakage and soaking the carpet.

The device has a number of electrodes which protrude from the bottom of the disk shaped body. It water or any moist material completes a circuit between any of the electrodes, the alarm will sound until the circuit is broken. The electrodes also protrude through the top of the disk shaped body, and on the top of the disk are located in a water splash ring. The splash ring and the upper electrodes are provided so that if water is dripping from above, if any lands in the splash ring it will complete a circuit between two of the electrodes and activate the enunciator.

On the top surface of the body is a cone which covers the enunciator. The cone also serves to deflect water into the splash ring.

The device is comprised of an upper body section, a lower body section, electrodes, a battery, an enunciator, deflector cone, and a lifting ring. The electrodes extend approximately ¼ inch out of the bottom of the body, and they extend approximately 1⁄16 inch out of the top of the body and are exposed in the splash ring. The electrodes in the present configuration are approximately 1⁄32 inch in diameter, but could obviously be much smaller or much larger. The two halves of the body and the cone snap together, and the unit in its present configuration is disposable. The battery is 3 volts, up to a maximum of 3 ½ volts. The device operates with a circuit which is normally open. The present configuration of the device has twelve electrodes which extend out the bottom of the body and twelve electrodes which extend out the top of the body. The twelve electrodes can be of any conductive material, and can be flat at the ends or pointed. The device can sit on a floor or a flat surface, such as the surface under a kitchen sink, or the floor behind a washing machine or drying machine. When a circuit is completed between any of the electrodes, the alarm will sound until the circuit is broken.

The electrodes can also be pointed, and can be pressed into contact with a carpet, earth such as in a crawl space, or even in a piece of wood in which the owner would like to know if it becomes wet. The lifting loop is provided so that a string may be attached to the device, and the device can be lowered behind an appliance such as a washing machine, and left in place. When the battery is dead on the device it can be pulled up and the unit can be easily replaced. The device also has a low-battery enunciator, which is activated when the battery becomes low and issues an audible signal alerting the user of the need to replace the unit. Although in the preferred embodiment the unit is disposable, it could also be configured to have a replaceable battery.

One application of the device is in a basement when leaks periodically occur, and carpet becomes wet. The electrodes of the device can be pressed into the carpet, and an alarm will sound when any layer of carpet becomes moist. Devices which do not have penetrating electrodes could only sit on the top of the carpet, and detect when the top of the carpet is wet.

Other features which could be utilized with the device include a battery test button, which when pressed would signal the battery strength. The device could also be configured to float, so that rising water would not muffle the sound of the alarm. The device could also be suspended at a certain height, and could announce when water reached a desired level, such as in a tank or a vessel. The enclosed drawings show one preferred embodiment of the device.

A preferred embodiment is shown in the figures. FIG. 1 is side view of the water leak detector and alarm of the present invention. This embodiment includes a leak detector body 12, which is comprised of a lower body section 14 and an upper body section 16. Attached to the upper body section 16 is a deflector 18, which includes a lifting ring 20. Extending from the leak detector body 12 are electrodes 22. In the preferred embodiment, the device is approximately two inches from the top of the lifting ring 20 to the bottom of the electrodes 22.

Figure 2:
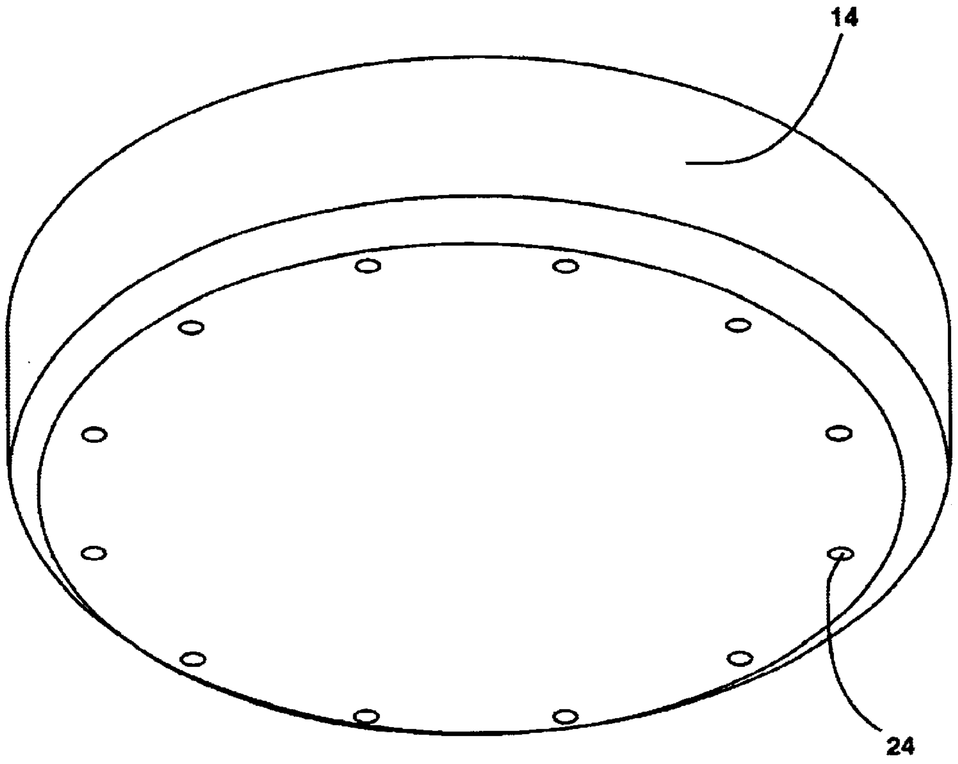
FIG. 2 is a perspective view of the lower body sections of the water detector.

FIG. 2 is a perspective view of the lower body section 14. This view shows a number of lower electrode ports 24. The electrodes 22 extend through the lower electrode ports 24 when the case is assembled.

Figure 3:
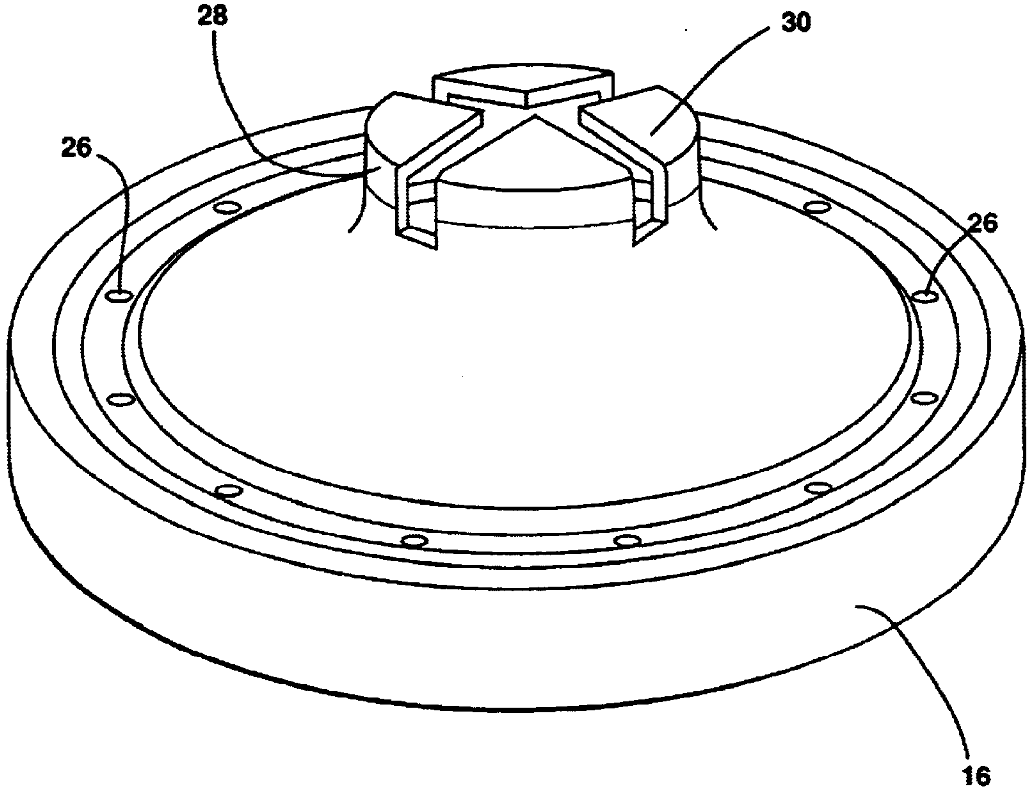
FIG. 3 is a perspective view of the upper body sections of the water detector.

FIG. 3 is a perspective view of the upper body section 16. Shown in FIG. 3 are a number of upper electrode ports 26. These are holes in the upper body section 16, through which electrodes 22 extend when the device is assembled. The upper body section 16 also includes a raised center post 28, which is made of four gripping arms 30. The gripping arms 30 are configured for locking relationship with a cone-shaped deflector 18.

Figure 4:
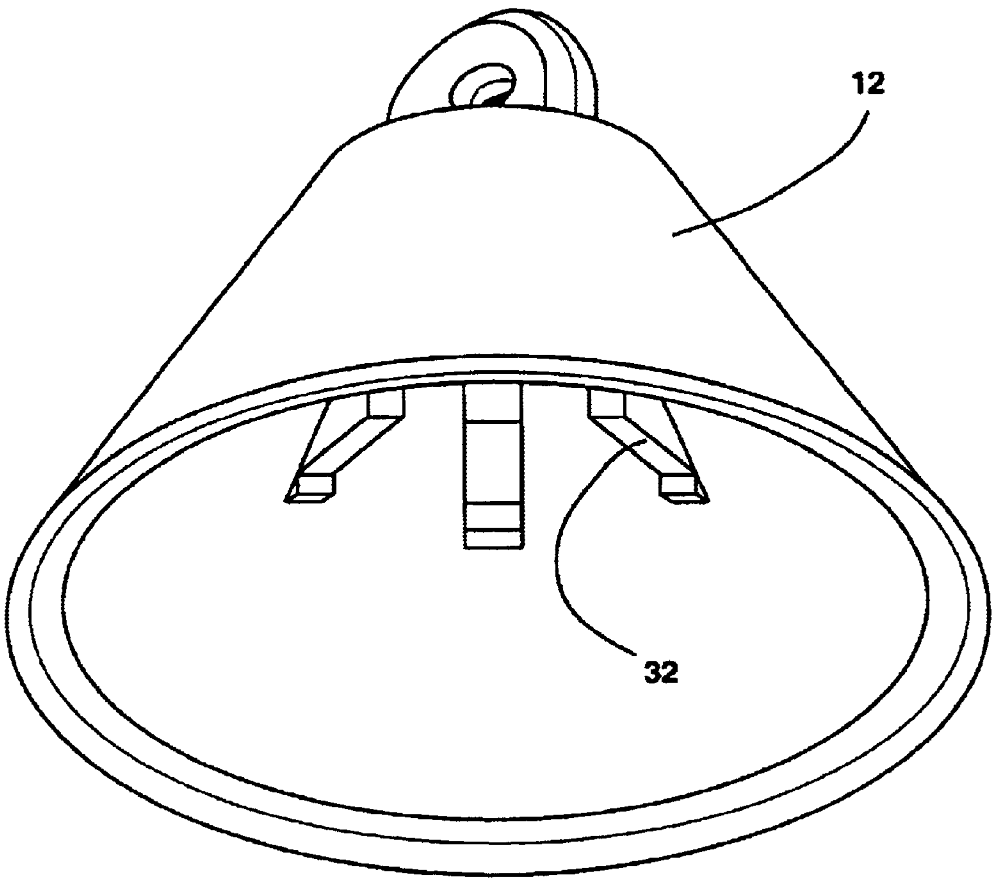
FIG. 4 is a perspective view of the deflector.

FIG. 4 is a perspective view of the deflector 18, showing mounting tabs 32, which interfit with the gripping arms 30 of the upper body section 16.

Figure 5:
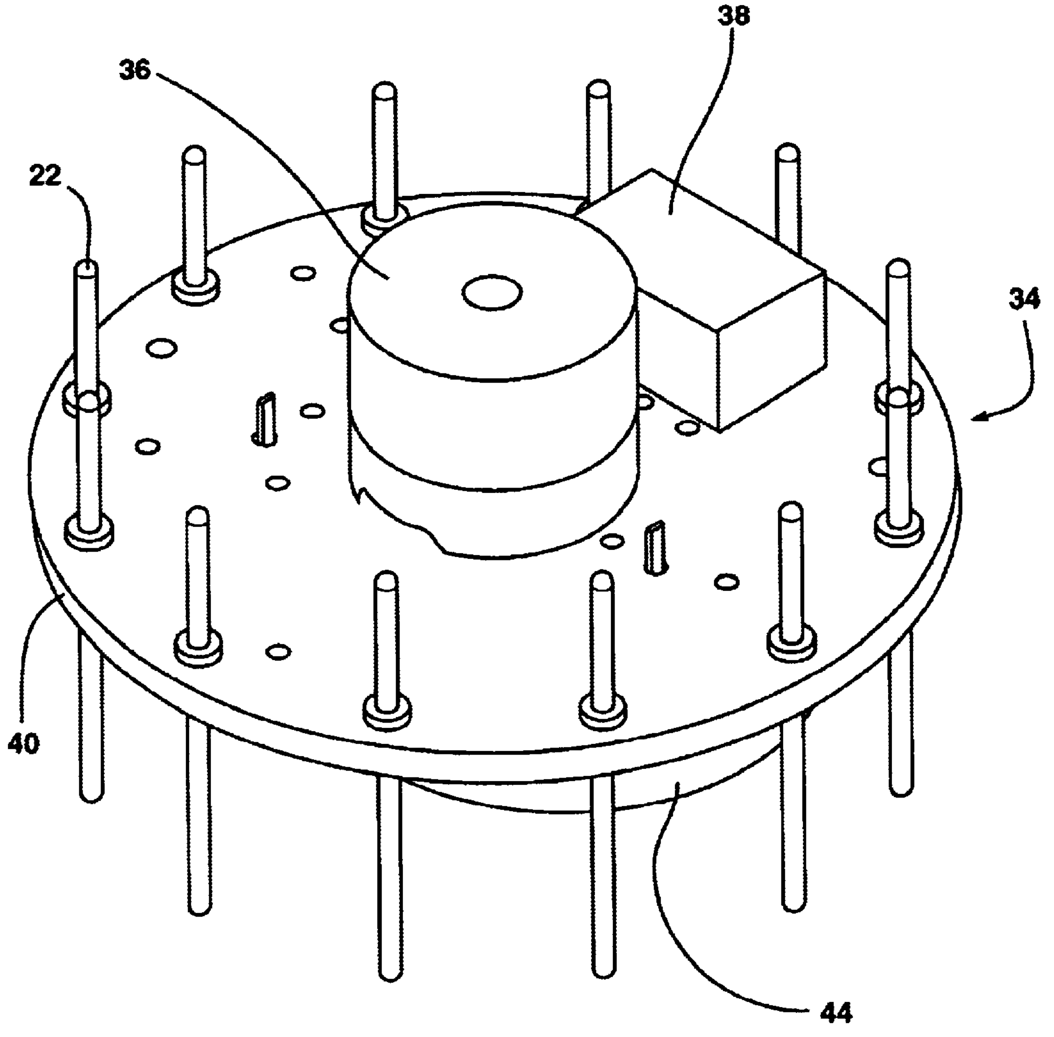
FIG. 5 is a perspective view of the electrical components of the water detector.

FIG. 5 shows the electrical components unit 34. The electrical components include electrodes 22, an enunciator 36, a PIC processor 38, which serves as the brains of the unit, and a circuit board 40 with conductive pathways 42 established on the circuit board 40. Also included is a battery 44.

Figure 6:
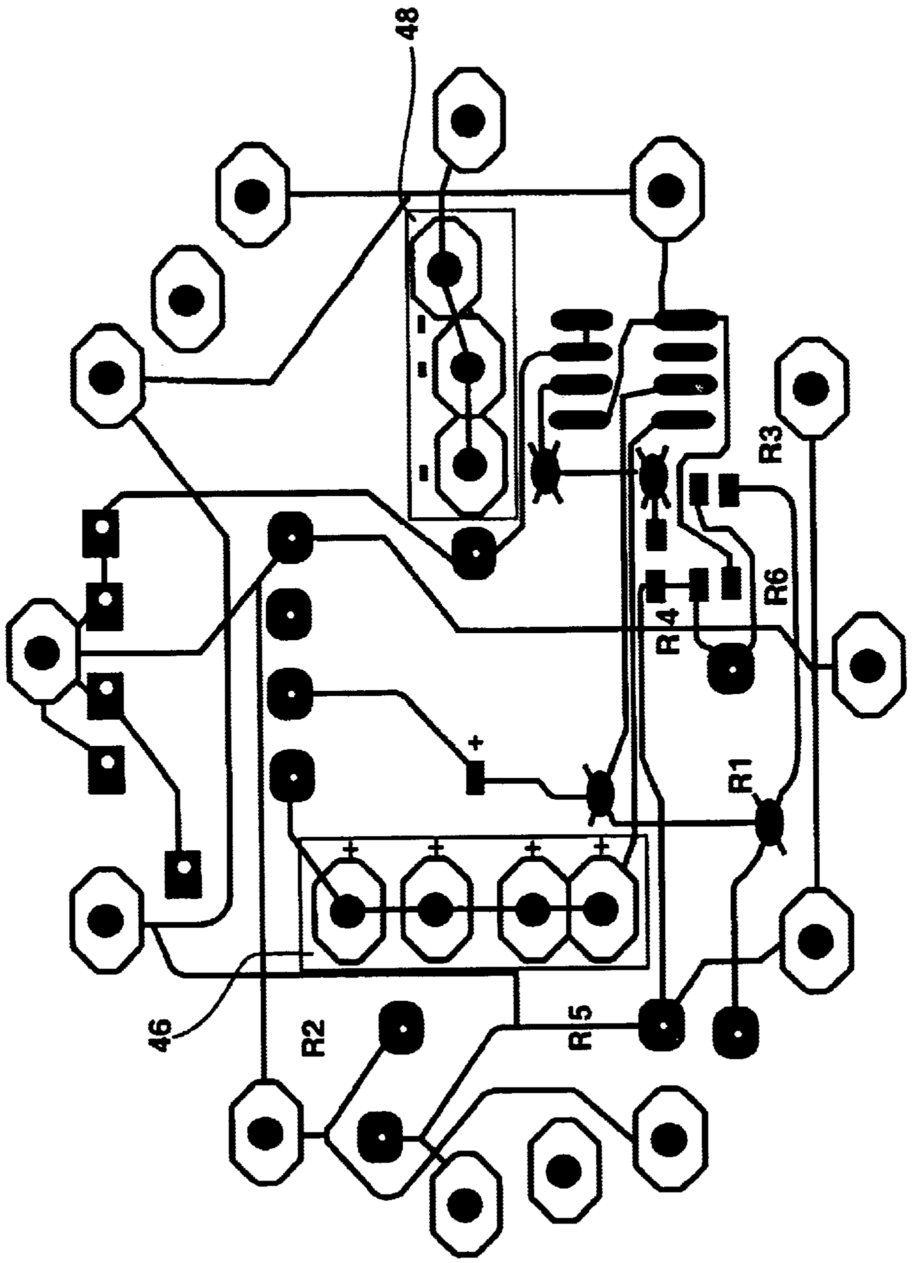
FIG. 6 is a view of the circuitry of the water detector.

FIG. 6 shows a more detailed view of the conductive pathways 42 on the circuit board 40, and the electrical layout of the device. Although the design of the circuitry is capable of being configured in a number of fashions, this particular figuration has been found to be effective. In this configuration, there are twelve electrodes which extend through holes or vias in the circuit board 40. The vias in the circuit board 40 form a conductive contact with each of the electrodes 22. Every other electrode is connected to the positive side of the battery and the alternating electrodes are connected to the negative side of the battery. In this configuration, if any positive electrodes find a path for electricity to any negative electrode, a circuit would be complete and the enunciator 36 will be activated. In the circuit in FIG. 6, the positive pole of the battery is shown at 46 and the negative pole of the battery is shown in block 48. The positive and negative electrodes are arranged around the periphery of the device.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

I claim:

1. A water leak detector for detecting water and moisture on a surface, said detector comprising:

a lower body section which defines a plurality of lower electrode ports, for housing electronic components of said water leak detector;

an upper body section which defines a plurality of upper electrode ports, said upper body section for joining with said lower body section and for housing said electronic components of said water leak detector;

a plurality of electrodes which are configured to extend through said lower electrode ports in said lower body section and through said upper electrode ports in said upper body section, and which provide for detection of moisture below said lower body section and for detection of moisture above said upper body section by completing a circuit between electrodes when moisture is present between any two of said plurality of electrodes;

a circuit board with electronic circuit and contact regions for said plurality of electrodes, said circuit board configured to mount between said lower body section and said upper body section;

an enunciator for signaling when said electronic circuit is completed between any two of said plurality of electrodes;

a battery for providing power to said electronic components and said enunciator;

wherein said plurality of electrodes are in open circuit which is closed when water or moisture completes said circuit between any two of said plurality of electrodes, and when said circuit is completed, power from said battery activates said enunciator to sound until said circuit is broken.

2. The water leak detector of claim 1, in which said electrodes are configured to penetrate materials for subsurface leak detection of moisture.

3. The water leak detector of claim 1 in which said lower body section and said lower body section form a body which is disc shaped.

4. The water leak detector of claim 1 in which said contact regions are vias defined in said circuit board, through which said plurality of electrodes extend.

5. The water leak detector of claim 1, in which said upper body section further includes a deflector, for directing water toward said plurality of electrodes.

6. The water leak detector of claim 5, in which said deflector is cone shaped, and configured for directing water toward said plurality of electrodes.

7. The water leak detector of claim 1, which further includes a lifting ring.

8. The water leak detector of claim 6 in which said deflector further includes a lifting ring.

9. The water leak detector of claim 1, in which said upper body section further includes a splash ring configured to collect water on said upper body section around said plurality of electrodes.

10. The water leak detector of claim 1 which further includes a low battery enunciator, for signaling when said battery is low in charge.

11. The water leak detector of claim 1, in which said water leak detector is configured for floating on water.

12. A water leak detector for detecting water on a surface, which comprises:

a lower body section which defines a plurality of lower electrode ports, for housing electronic components of said water leak detector;

an upper body section which defines a plurality of upper electrode ports, for joining with said lower body section to form a disc shaped body, and for housing said electronic components of said water leak detector, in which said upper body section includes a splash ring for collecting water around said plurality of electrodes;

a plurality of electrodes which are configured to extend through said lower electrode ports in said lower body section and through said upper electrode ports in said upper body section, and which provide for detection of moisture below said lower body section and water dripping on said upper body section, by completing a circuit when water or moisture is present between any two of said plurality of electrodes;

a circuit board with electronic circuit and contact regions for said plurality of electrodes, which is configured to mount in said lower body section and said upper body section;

an enunciator for signaling when a circuit is completed between any two of said plurality of electrodes;

a low battery enunciator function, for activating said enunciator when said battery is low in charge;

a battery for providing power to said electronic circuit and said enunciator;

a conical deflector which attaches to said upper body section and which includes a lifting ring, and is configured to deflect water toward said splash ring in said upper body section;

wherein said plurality of electrodes are in open circuit which is closed when water or moisture completes a circuit between any two of said plurality of electrodes, and when said circuit is complete, power from said battery activates said enunciator to sound until said circuit is broken.

* * * * *